US008842987B2

(12) United States Patent
Lee

(10) Patent No.: US 8,842,987 B2
(45) Date of Patent: Sep. 23, 2014

(54) SECURITY IN MULTIWAVELENGTH OPTICAL NETWORKS

(71) Applicant: FMR LLC, Boston, MA (US)

(72) Inventor: Richard Lee, North Providence, RI (US)

(73) Assignee: FMR LLC, Boston, MA (US)

( * ) Notice: Subject to any disclaimer, the term of this patent is extended or adjusted under 35 U.S.C. 154(b) by 125 days.

(21) Appl. No.: 13/644,121

(22) Filed: Oct. 3, 2012

(65) Prior Publication Data

US 2014/0093242 A1  Apr. 3, 2014

(51) Int. Cl.
| H04B 10/00 | (2013.01) |
| H04J 14/00 | (2006.01) |
| H04B 10/24 | (2006.01) |
| H04B 10/20 | (2006.01) |

(52) U.S. Cl.
USPC ............................. 398/40; 398/42; 398/58

(58) Field of Classification Search
CPC ......... H04B 10/85; H04B 10/70; H04J 14/02; H04J 14/021; H04J 14/0201; H04J 2203/0089
USPC ............................. 398/40–42, 82, 83, 91, 58
See application file for complete search history.

(56) References Cited

U.S. PATENT DOCUMENTS

| 7,613,396 | B2 * | 11/2009 | Maeda et al. | 398/79 |
| 7,869,599 | B2 * | 1/2011 | Tajima | 380/256 |
| 7,949,254 | B1 | 5/2011 | Stevens | |
| 8,050,566 | B2 * | 11/2011 | Luo et al. | 398/89 |
| 8,270,841 | B2 * | 9/2012 | Nishioka et al. | 398/140 |
| 2005/0100338 | A1 * | 5/2005 | Yeon et al. | 398/78 |
| 2008/0034431 | A1 | 2/2008 | Mergen | |
| 2010/0074444 | A1 | 3/2010 | Etemad | |
| 2010/0183309 | A1 | 7/2010 | Etemad et al. | |
| 2014/0016926 | A1 * | 1/2014 | Soto et al. | 398/16 |

FOREIGN PATENT DOCUMENTS

| EP | 2068526 A2 | 6/2009 |
| WO | 03073137 A2 | 9/2003 |

OTHER PUBLICATIONS

Medard et al., "Security Issues in All-Optical Networks", IEEE Network, May/Jun. 1997, pp. 42-48.
Wang et al., "Physical Encoding in Optical Layer Security", Journal of Cyber Security and Mobility, 2012, pp. 83-100, River Publishers.
International Search Report and Written Opinion issued in connection with PCT Application No. PCT/US2013/062803 mailed Dec. 20, 2013.

* cited by examiner

*Primary Examiner* — Dalzid Singh
(74) *Attorney, Agent, or Firm* — Gesmer Updegrove LLP

(57) ABSTRACT

An optical network including at least one optical network node that receives an optical signal for either transmission or reception. The optical network node analyzes the optical signal and applies communication protocols necessary for optical transmission or reception of the optical signal to or from the optical network. At least one communication module is coupled to the at least one optical network node either decodes or encodes the optical signal by identifying or adding at least one wavelength to the optical signal for security.

30 Claims, 6 Drawing Sheets

FIG. 1

SECURITY IN MULTIWAVELENGTH OPTICAL NETWORKS

BACKGROUND OF THE INVENTION

The invention is related to the field of optical networks, and in particular to a novel technique for reserving at least one wavelength explicitly for security, thus allowing for easy encoding and decoding in an optical network.

Communication systems have become an important portion of today's electronic society. Generally speaking, these networks and systems provide the ability for vast amounts of information to be communicated as desired and/or necessary. As is well known, examples of these communication systems include the internet, Ethernet systems, networks within contained systems (automobiles, aircraft, etc.), home networks, and wireless networks. Further, cellular telephone, 20 WiFi, SatCom, IEEE 802.11, etc., systems are also considered to be other types of a communication network.

Fiber optic communication is widely utilized in various systems due to the well known advantages of optical communication. That said, optical communication networks and systems are continuously evolving as the technology becomes more and more advanced. The further development of optical components allows for new applications and options involving optical signals. System designers simply have more tools at their disposal, thus giving them more options.

Wavelength division multiplexing (WDM) optical transmission technology is on the rise as a solution for satisfying remarkable increase of demand for high transmission capacity. The WDM optical transmission technology can simultaneously transmit several wavelength channels in one optical fiber. For example, when one wavelength channel has transmission speed of 10 Gb/s and 50 wavelengths are simultaneously transmitted, the WDM optical transmission technology can have transmission speed of 500 Gb/s, and thus the WDM optical transmission technology is very effective in large capacity transmission.

In an optical network, which uses the WDM optical transmission technology, a wavelength channel needs to be added or dropped in a network node in order to increase efficiency and variability of the optical network. A predetermined wavelength channel can be added/dropped in a predetermined node by using a fixed optical add drop multiplexer (F-OADM) technology. A reconfigurable optical add drop multiplexer (ROADM) technology is required for efficiency of the optical network, and also in order to economically use network resources. When the ROADM technology is used, a predetermined channel can be added/dropped in a predetermined node, and thus an efficient network operation is possible.

However, there lacks an integratable security platform that allows for easy encoding and decoding of security information across different protocols without causing unduly delays and lowering of performance in an optical network.

SUMMARY OF THE INVENTION

According to one aspect of the invention, there is provided an optical network. The optical network includes at least one optical network node that receives an optical signal either for transmission or reception. The optical network node analyzes the optical signal and applies communication protocols necessary for optical transmission or reception of the optical signal to or from the optical network. At least one communication module is coupled to the at least one optical network node that either decodes or encodes the optical signal by identifying or adding at least one wavelength to the optical signal for security.

According to another aspect of the invention, there is provided an ROADM structure. The ROADM structure includes an optical network node that receives an optical signal or either transmission or reception. The optical network node analyzes the optical signal and applies communication protocols necessary for optical transmission or reception of the optical signal to or from the optical network. A communication module is coupled to the optical network node that either decodes or encodes the optical signal by identifying or adding at least one wavelength to the optical signal for security.

According to another aspect of the invention, there is provided a method of managing the security of an optical network. The method includes receiving an optical signal for either transmission or reception using an optical network node. The optical network node analyzes the optical signal and applies the communication protocols necessary for optical transmission or reception of the optical signal to or from the optical network. Also, the method includes decoding or encoding the optical signal using a communication module by identifying or adding at least one wavelength to the optical signal for security.

BRIEF DESCRIPTION OF THE DRAWINGS

FIG. 1 is a schematic diagram illustrating an optical network used in accordance with the invention;

DETAILED DESCRIPTION OF THE INVENTION

Figure 2:
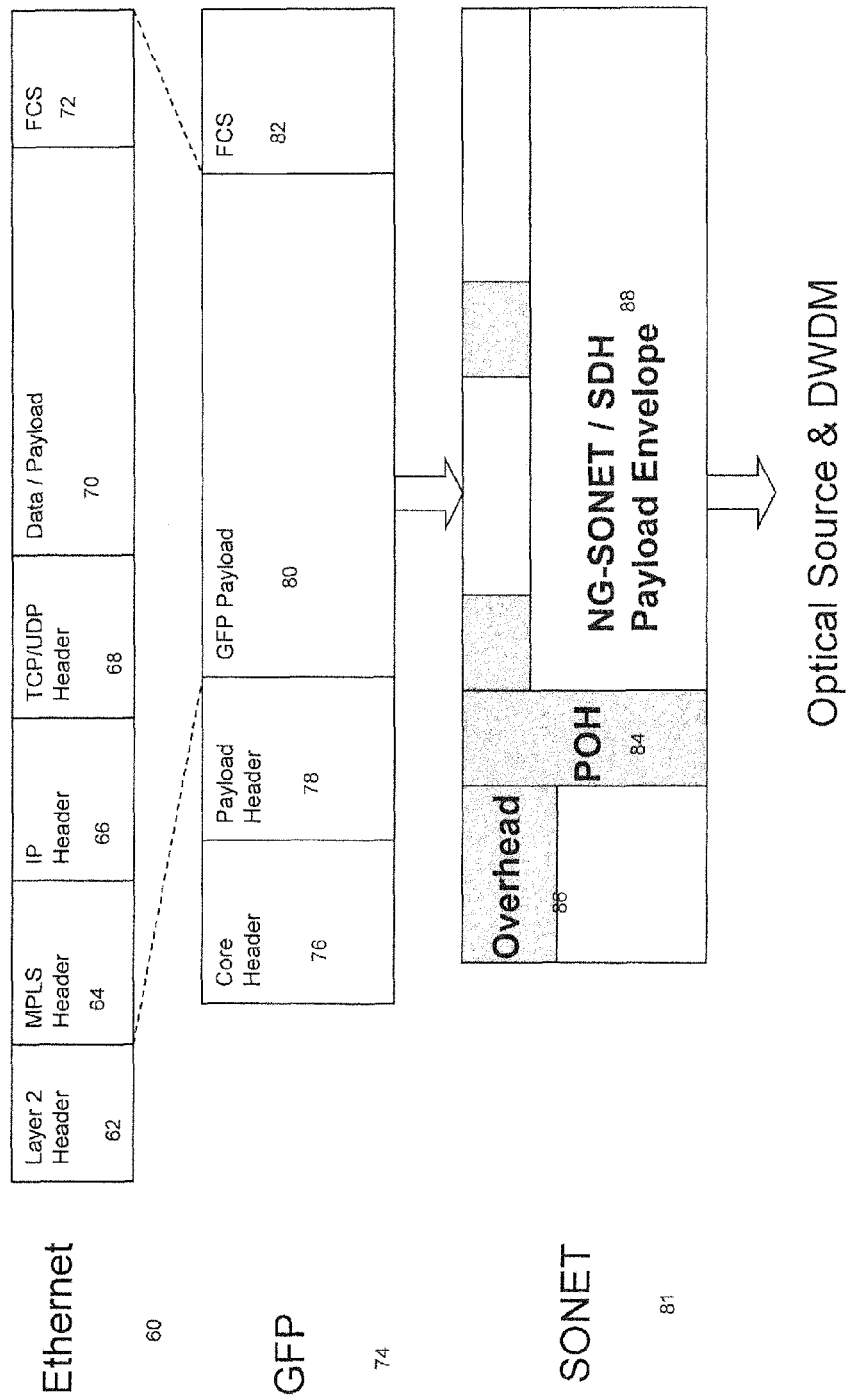
FIG. 2 is a schematic diagram illustrating an example of SONET protocol stacks used in optical communication in accordance with the invention.

The invention involves a novel technique for providing security in an optical network. By reserving at least one wavelength for security, it allows for easy encoding and decoding of optical signals without creating unnecessary implementations to either the optical network or protocols used in optical communication.

Figure 1:
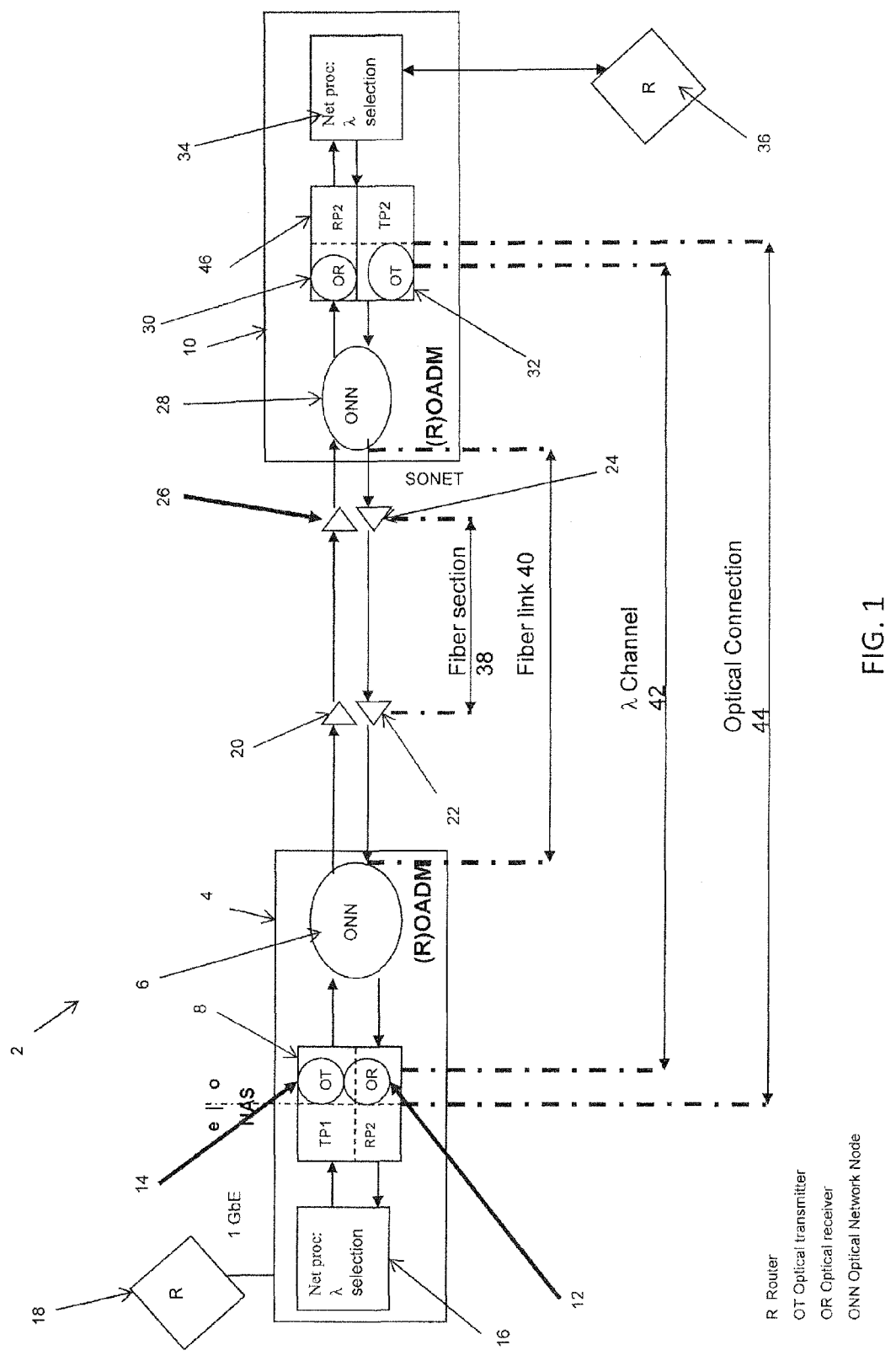

FIG. 1 is a schematic diagram illustrating an exemplary embodiment of an optical network 2 used in accordance with the invention. The optical network 2 includes reconfigurable optical add-drop multiplexer (ROADM) 4 having an optical network node (ONN) 6. The ONN 6 can receive an optical signal provided to the ROADM 4 as well as the ONN 6 can format an optical signal to be transmitted to a remote ROADM 10. Note the ONN 6 performs and formats the optical signal to be received by a Rx/Tx module 8. The Rx/Tx module 8 includes an optical receiver 12, optical transmitter 14, receiver RP1, and transmitter TP1. The optical transmitter 12 converts an electrical signal provided by the transmitter TP1 into an optical signal to send to the ONN 6 for transmission. The ONN 6 receives the optical signal and formats the information into the appropriate communication protocol to be sent over an fiber link 40 that can be routed through underground conduits and buildings, and multiple kinds of optical fiber amplifiers (OFAs).

The ROADM 10 also includes a Rx/Tx module 46 having an optical receiver 30 to convert the signal as an electrical signal. The information transmitted is typically digital information generated by computers, telephone systems, and cable television companies.

A ROADM is a device that can add, block, pass or redirect modulated infrared (IR) and visible light beams of various wavelengths in a fiber optic network. ROADMs are used in systems that employ wavelength division multiplexing (WDM).

Before the development of optical multiplexing devices such as ROADMs, signal routing in fiber optic networks was done by converting the IR or visible beams to electrical signals and routing those signals using conventional electronic switches. The rerouted electrical signals were then converted back into IR or visible beams.

In a ROADM, switching is accomplished without optical-to-electrical or electrical-to-optical conversion using three operations called add, drop and cut-through. An outgoing IR or visible beam can be generated (the add operation) or an incoming beam terminated (the drop operation). A beam can also be passed through the device without modification (the cut-through operation). In combination, these functions allow optical signal routing of considerable complexity. The configuration of the system can be changed remotely.

Two major ROADM technologies are in current use. They are wavelength blocking (WB) and planar light-wave circuit (PLC). Wavelength blocking, also referred to as first-generation ROADM technology, is the older of the two. When a wavelength change is necessary for a particular channel, the IR or visible light beam at the original wavelength is filtered out and its data extracted. Then the data is impressed onto a beam of another wavelength. PLC or second-generation ROADM technology in effect combines these steps, streamlining the process and reducing the cost.

Neither the WB nor the PLC ROADM designs facilitate true optical branching, in which beams of any wavelength can be directly routed to any desired port without the need to perform multiple intermediate operations. Optical branching capability is important in the deployment of efficient, reliable, high-volume optical networks designed to provide advanced services such as videoconferencing and video on demand (VoD).

The optical transmitter 14 can be a semiconductor device, such as light-emitting diodes (LEDs) and laser diodes. The difference between LEDs and laser diodes is that LEDs produce incoherent light, while laser diodes produce coherent light. For use in optical communications, semiconductor optical transmitters must be designed to be compact, efficient, and reliable, while operating in an optimal wavelength range, and directly modulated at high frequencies.

The optical receiver 12 receives from the ONN 6 a respective optical signal and converts this optical signal into an electrical signal. Before all the wavelengths of the optical signal are converted, the Rx/Tx module 8 selects the respective at least wavelengths associated with security and using the optical receiver 12 converts these wavelengths to electrical signals to be sent to receiver RP1 to ascertain if the information has the appropriate credentials. The optical receiver 12 can be a photodetector, which converts light into electricity using the photoelectric effect. The photodetector is typically a semiconductor-based photodiode. Several types of photodiodes include p-n photodiodes, p-i-n photodiodes, and avalanche photodiodes. Metal-semiconductor-metal (MSM) photodetectors are also used due to their suitability for circuit integration in regenerators and wavelength-division multiplexers.

Optical-electrical converters are typically coupled with a transimpedance amplifier and a limiting amplifier to produce a digital signal in the electrical domain from the incoming optical signal, which may be attenuated and distorted while passing through the channel. Further signal processing such as clock recovery from data (CDR) performed by a phase-locked loop may also be applied before the data is passed on.

The Rx/Tx module 8 includes the capacity to encode and decode the security credentials provided by an optical signal. In particular, the Rx/Tx module 8 uses at least 1 wavelength explicitly for security. Using the optical transmitter, the Rx/Tx module 8 can add to an outgoing optical signal and at least one wavelength for security purposes providing the appropriate credentials at another optical ROADM.

The ROADM 8 using its corresponding Rx/Tx module 8 can perform decoding by searching the incoming optical signal for the at least one wavelength associated with security. Using an optical receiver 12, the Rx/Tx module 8 converts the at least wavelength associated with security to a corresponding at least one electrical signal associated with security for which the receiver RP1 provides to a network procedure module 16 to determine the security credentials of the incoming optical signal so as to determine whether a communication link can be establish with a router 18.

The Rx/Tx module 8 can utilize a "Filter Authority" to which enterprises can subscribe to. Filter authority provides filter, format and encode/decode mechanism where appropriate. The filter authority can local in the ROADM or remote.

The network procedure module 16 receives from the Rx/Tx module 8 via the receiver RP1 the respective at least one electrical signal associated with security and either communicates with an external security authority or determine locally if the at least one electrical signal has the proper credentials. If the proper credentials are provided the network procedure module 16 provides a communication link to a router 18. Otherwise, communication is terminated and the request to connect to the router 18 is terminated.

The ROADM 10 is similar to the ROADM 4 described herein. Both ROADMs 4, 10 engage in communication with each other using incoming and outgoing optical signals sent via the fiber link 40. To prevent attenuation of incoming and outgoing optical signals, optical fiber amplifiers (OFAs) 20, 22, 24, 26 are used within selective fiber sections 38 on the fiber link 40. Also, the ROADMS 4, 10 communicate using the SONET protocol.

The ROADM 10 comprises an optical network node (ONN). The ONN 28 can receive an optical signal provided to the ROADM 10 as well as ONN 28 can format an optical signal to be transmitted to a remote ROADM 4. Note the ONN 28 performs and formats the optical signal to be received by a Rx/Tx module 46. The Rx/Tx module 46 includes an optical receiver 30, optical transmitter 32, receiver RP2, and transmitter TP2. The optical transmitter 32 converts an electrical signal provided by the transmitter TP2 into an optical signal to send to the ONN 28. The ONN 28 receives the optical signal and formats the information into the appropriate communication protocol to be sent over the fiber link 40 that is routed through underground conduits and buildings, multiple kinds of optical fiber amplifiers (OFAs) 20, 22, 24, 26, and the ROAM 4. The optical receiver 30 receives from the ONN 28 a respective optical signal and converts it into an electrical signal to be sent to RP1 to ascertain if the information within the signal has the appropriate credentials.

The Rx/Tx module 46 includes the capacity to encode and decode the security credentials provided by incoming and outgoing optical signal. In particular, the Rx/Tx module 46 can uses at least 1 wavelength explicitly for security. Using the optical transmitter, the Rx/Tx module 46 can encode an outgoing electrical signal by adding at least one wavelength for security to the outgoing optical signal. The ROADM 10 using its corresponding Rx/Tx module 46 performs the decoding of the at least one wavelength for security received by the outgoing optical signal in the same fashion as described herein for the Rx/Tx module 8. Using the optical receiver 30, the Rx/Tx module 46 retrieves the at least one wavelength for security of an incoming optical signal and converts the at least one wavelength for security to a corresponding at least one electrical security signal for which the receiver RP2 sends to a network procedure module 34 to determine the security credentials of the incoming signal so as to determine whether a communication link can be established with a router 36.

A wavelength channel 42 is formed between the optical transmitter 14 and optical receiver 12 of the Rx/Tx module 8 and the optical transmitter 30 and optical receiver 32 of the Rx/Tx module 46. Moreover, an optical connection between the transmitter TP1 and receiver TP1 of the Rx/Tx module 8 and the transmitter TP2 and receiver TP2 of the Rx/Tx module 46.

The Rx/Tx module 46 can utilize a "Filter Authority" to which enterprises subscribe. Filter authority can be used to provide filter, format and encode/decode mechanism where appropriate. The filter authority can be local in the ROADM or a remote location.

FIG. 2 is a schematic diagram illustrating protocol stacks 60, 74, 81 used in optical communication. Given that the invention utilizes both optical communication and network communication, Ethernet, GFP, and SONET communication protocols are used. Ethernet is the collective name for a variety of closely related network standards. As a network standard, each version of Ethernet includes specifications for the physical network layer: how the signals will be sent and received. Protocols like IP or NetWare, in contrast, define communications without reference to the physical transport medium.

Generic Framing Procedure (GFP) is a multiplexing technique defined by ITU-T G.7041. This allows mapping of variable length, higher-layer client signals over a circuit switched transport network like OTN, SDH/SONET or PDH. The client signals can be protocol data unit (PDU) oriented (like IP/PPP or Ethernet Media Access Control) or can be block-code oriented (like fibre channel).

Synchronous Optical Networking (SONET) and Synchronous Digital Hierarchy (SDH) are standardized multiplexing protocols that transfer multiple digital bit streams over an optical fiber using lasers or highly coherent light from light-emitting diodes (LEDs). At low transmission rates data can also be transferred via an electrical interface. The method was developed to replace the Plesiochronous Digital Hierarchy (PDH) system for transporting large amounts of telephone calls and data traffic over the same fiber without synchronization problems.

The Ethernet protocol stack 60 comprises a layer 2 header 62, Multiprotocol Label Switching (MPLS) header 64, IP header 66, Transport Control Protocol (TCP)TCP/User Datagram Protocol (UDP) header 68, data/payload region 70, and frame check sequence (FCS) 72. The layer 2 header 62 defines a layer 2 address and the MPLS header 64 defining multiprotocol label switching information. The IP header 66 defines the IP address used for communication. The TCP/UDP header 68 includes information regarding communicating in TCP/UDP protocols. The data/payload region 70 includes all information associated with a site including pictures, videos, music, text, or the like. The frame check sequence (FCS) 72 includes the extra checksum characters added to a frame in an Ethernet communication protocol for error detection.

The GFP protocol stack 74 includes a core header 76, payload header 78, and GFP payload 80, and FCS 82. The core header 76 includes information indicating the length of the payload area and core header error control. The payload header 78 includes information identifying the type of payload, indicating the presence of the payload FCS, identifying the type of user payload, and the type header error control. GFP payload 80 includes content of the Ethernet protocol stack 60. The FCS 82 includes the FCS of the current GFP payload.

SONET protocol stack 81 includes an overhead header 86, payload overhead (POH) header 84, and NS-SONET/SDH payload envelope 88. The overhead header 86 includes information used for signaling and measuring transmission error rates. The POH header 84 includes information regarding end-to-end signaling and error measurement. The NS-SONET/SDH payload envelope 88 includes information from the GFP 74.

Once data have been appropriately processed in accordance with the protocols used it can be sent to other optical systems for retrieval. The invention uses these protocols to communicate in both network and optical domains. Also, the invention can incorporate at least one wavelength to define security information as to the credentials of the optical signal. This can be done within the communication protocols described above without burdensome changes.

Figure 3:
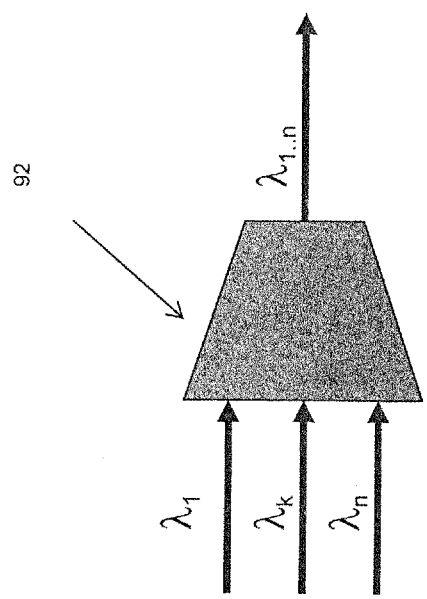
FIG. 3 is a schematic illustrating a multiplexing module used in accordance with the invention.

FIG. 3 is a schematic diagram illustrating a multiplexing module 92 used in accordance with the invention. The Rx/Tx modules 8, 46 include a multiplexing module 92 to aid in preparing an optical signal for transmission. In particular, the multiplexing module 92 is used for multiplexing and routing different channels of light into or out of a single mode fiber (SMF). Moreover, the multiplexing module 92 includes the capability to add one or more new wavelength channels to an existing multi-wavelength WDM signal, and/or to drop (remove) one or more channels, passing those signals to another network path. In this case, the multiplexing module 92 receives from optical transmitters 14, 32 optical signals $\lambda_1$-$\lambda_k$, and encodes optical signal $\lambda_1$-$\lambda_k$ with the at least one wavelength for security $\lambda_n$, to generate an output signal $\lambda_{1\ldots n}$. The Rx/Tx modules 8, 46 provide the output signal $\lambda_{1\ldots n}$ to the ONN 6, 28 for optical transmission. Encoding can be utilized in conjunction with optical filters. Standard data encryption techniques can be utilized to provide privacy to security data stream. Optical filters for security channel(s) can be formalized using Filter Authorities.

Figure 4:
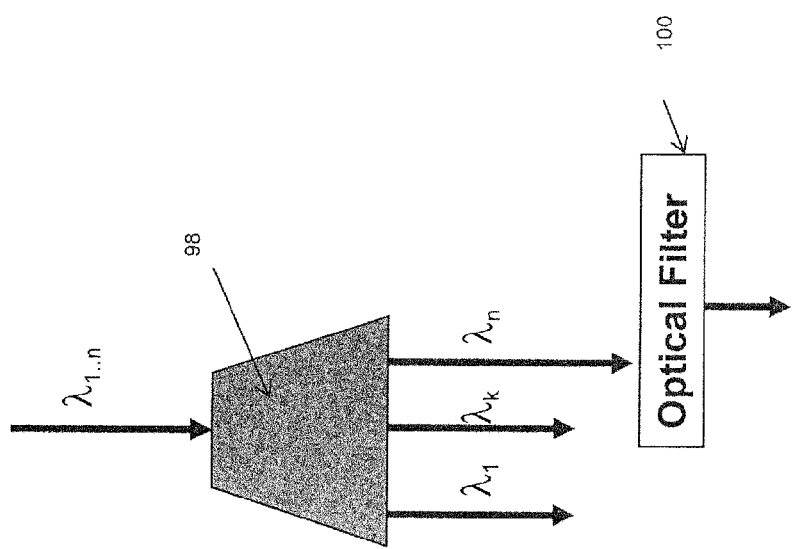
FIG. 4 is a schematic illustrating a demultiplexing module used in accordance with the invention.

FIG. 4 is a schematic diagram illustrating a demultiplexing module 98 used in accordance with the invention. The Rx/Tx modules 8, 46 include a demultiplexing module 98 to aid in preparing to decode an incoming optical signal. The main function of the demultiplexing module 98 is to receive from a Rx/Tx modules 8, 46 an incoming optical signal having multiple optical wavelengths $\lambda_{1\ldots k\ldots n}$ and separate it into its frequency components $\lambda_1 \ldots \lambda_k$ as well as the wavelength reserved for security $\lambda_n$, which are coupled in as many individual fibers as there are wavelengths. The wavelength $\lambda_n$ reserved for security is forwarded to either an optical filter 100 or network procedure modules 16, 34 via receivers RP1, RP2 for further formatting and decoding.

An optical multiplexer functions exactly in the opposite manner. It receives many optical wavelengths from many fibers and converges them into one beam that is coupled into a single fiber. There are two classifications of optical demultiplexer devices, passive and active. Passive demultiplexers are based on prisms, diffraction gratings, and spectral (frequency) filters. Active demultiplexers are based on a combination of passive components and tunable detectors, each detector tuned to a specific frequency. Decoding can be utilized in conjunction with standard optical filters. Standard data encryption techniques can be utilized to provide privacy to security data stream. Optical filters for security channel(s) can be formalized using Filter Authorities.

Figure 5A:
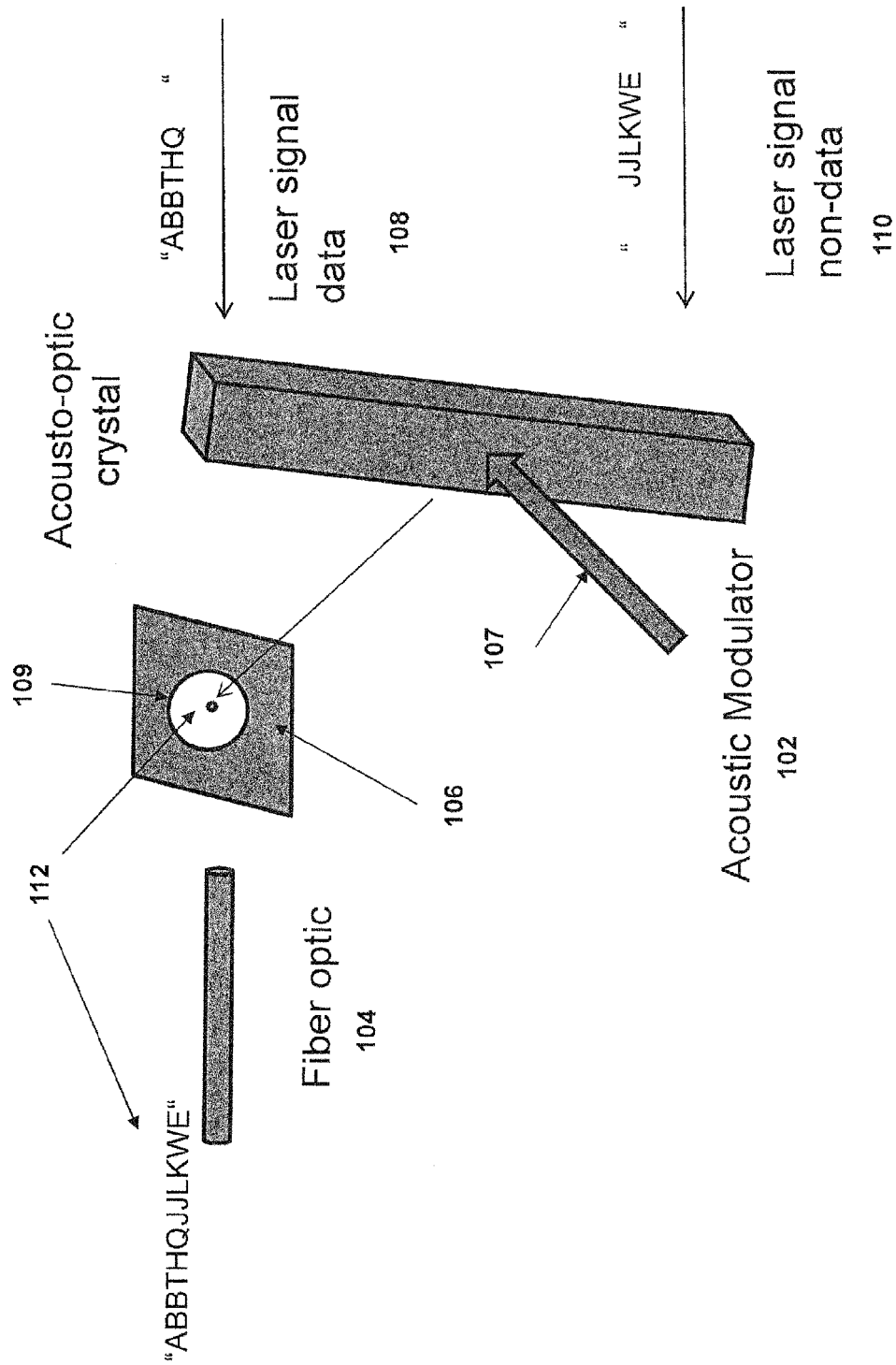
FIGS. 5A-5B are schematic diagrams illustrating the encoding and decoding techniques used in accordance with the invention.
Figure 5B:
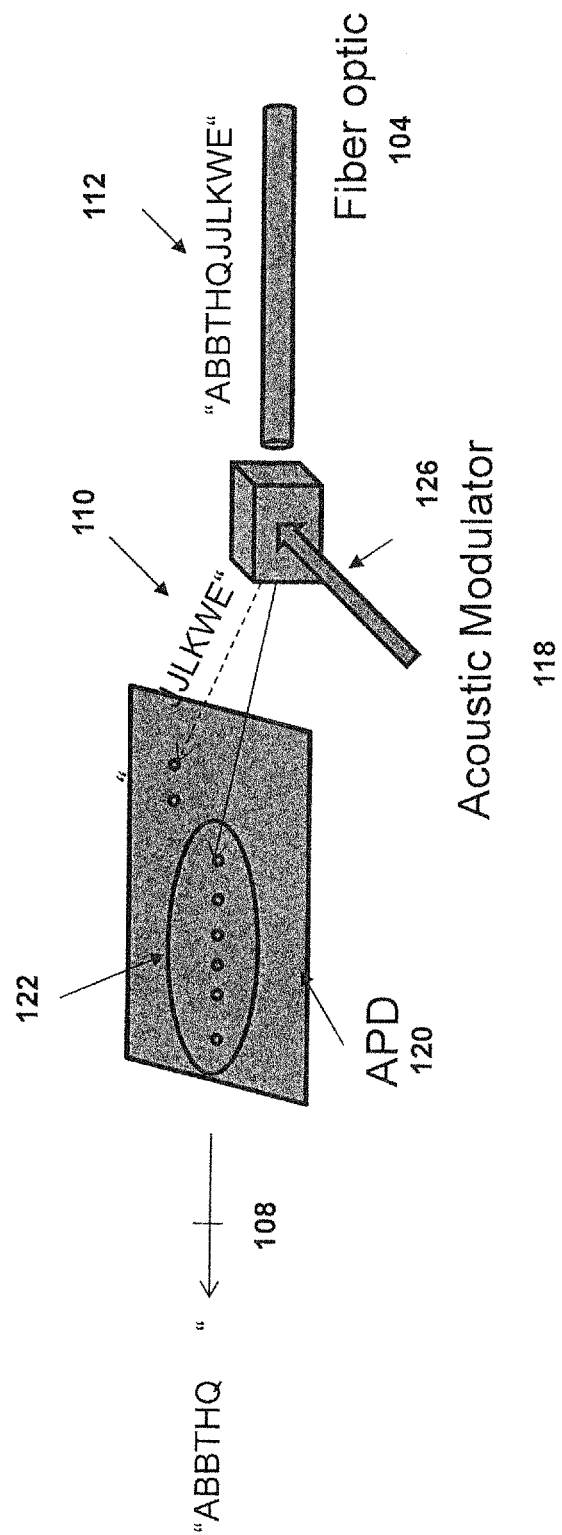

FIG. 5A shows an exemplary embodiment used for encoding in accordance with the invention. To encode a laser signal 108 requires using an acoustic modulator 102 that receives the laser signal 108 as well as a non laser signal 110 where the acoustic modulator outputs an encoded laser signal 112 that passes thru the aperture 109 of the avalanche photodiode (APD) 106. The acoustic modulator 102 receives an acoustic signal 107 that allows the encoded laser signal 112 to pass thru the aperture 109. The encoded laser signal 112 is forwarded for transmission through an optical fiber 104. Note the encoded laser signal 114 includes combining the data of the laser signal 108 and non data laser signal 112. The non data laser signal 112 can be used as a security mechanism to check the authenticity of the encoded laser signal 112. FIG. 5B shows the implementation to decode the optical signal 112 in accordance with the invention. A second acoustic modulator 118 receives the encoded laser signal 112 provided by the optical fiber 104. Using an acoustic signal 126, the acoustic modulator 118 decodes the laser signal 112 into two parts: the laser signal 108 and non laser signal 110 as mentioned in FIG. 5A. The acoustic signal 126 forces the non-laser signal 110 to be deflected outside the aperture 122 of APD 120 but the laser signal 108 is not deflected and passes thru the aperture 122. APDs 106, 120 are optical filters allowing for optical signals that passes thio the apertures of the APDs 106, 120. Note other types of modulators can be used in accordance with the invention as described herein.

The invention provides an efficient technique to implement security without creating unneeded changes to the overall optical network and communication protocols used for communication. The invention utilizes at least one additional wavelength for security which can be encoded in or decoded from an optical signal without adding delay to the optical network. Given the inherent advantages optical communication already provides, the invention implements a novel optical security arrangement that can be applied using commonly known optical devices. Thus, the invention eliminates the need to specifically design devices so as to allow the invention to be used. The invention is easily useable in any optical network commercially available today. Encoding and decoding can be utilized in conjunction with standard optical filters. Moreover, standard data encryption techniques can be utilized to provide privacy to security data stream as well as optical filters for security channel(s) can be formalized using Filter Authorities.

Although the present invention has been shown and described with respect to several preferred embodiments thereof, various changes, omissions and additions to the form and detail thereof, may be made therein, without departing from the spirit and scope of the invention.

What is claimed is:

1. An optical network comprising:
   at least one optical network node that receives an optical signal for transmission and reception, said optical network node analyzes the optical signal and utilizes communication protocols necessary for optical transmission and reception of the optical signal to or from the optical network; and
   at least one communication module coupled to the at least one optical network node that either decodes or encodes the optical signal by identifying or adding at least one wavelength to the optical signal for security, the at least one communication module adds the at least one wavelength for security during an encoding process while during a decoding process the at least one communication module searches and converts the at least one wavelength to establish a communication link to a router.

2. The optical network of claim 1, wherein the at least one communication module comprises a optical transmitter that receives an electrical signal and converts the electrical into the optical signal.

3. The optical network of claim 2, wherein the at least one communication module includes a transmitter that receives the electrical signal provides the electrical signal to the optical transmitter for transmission.

4. The optical network of claim 1, wherein the at least one communication module comprises an optical receiver that receives the optical signal from the optical network node network and converts the optical signal to an electrical signal.

5. The optical network of claim 4, wherein the at least one communication module comprises a receiver that receives the electrical signal provides the electrical signal to network procedure module for processing.

6. The optical network of claim 1, wherein the at least one communication module comprises a multiplexer module that combines the plurality of wavelengths associated with the optical signal and the at least one wavelength for security to form an encoded optical signal.

7. The optical network of claim 6, wherein the at least one communication module uses optical filters for encoding.

8. The optical network of claim 1, wherein the at least one communication module comprises a demultiplexer module that separates the plurality of wavelengths associated with the optical signal and the at least one wavelength for security to decode the optical signal, the communication module sends the at least one wavelength for security for further processing to determine its credentials.

9. The optical network of claim 8, wherein the at least one communication module uses optical filters for decoding.

10. The optical network of claim 1, wherein the at least one communication protocols comprise Ethernet, general frame procedure, and SONET protocols.

11. The ROADM structure of claim 1, wherein the communication module comprises a optical transmitter that receives an electrical signal and converts the electrical into the optical signal.

12. The ROADM structure of claim 11, wherein the communication module includes a transmitter that receives the electrical signal provides the electrical signal to the optical transmitter for transmission.

13. The ROADM structure of claim 1, wherein the communication module comprises an optical receiver that receives the optical signal from the ROADM structure node network and converts the optical signal to an electrical signal.

14. The ROADM structure of claim 13, wherein the communication module comprises a receiver that receives the electrical signal provides the electrical signal to network procedure module for processing.

15. A reconfigurable optical add-drop multiplexer (ROADM) structure used in an optical network, the ROADM structure comprising:
   an optical network node that receives an optical signal for transmission and reception, the optical network node analyzes the optical signal and utilizes communication protocols necessary for optical transmission and reception of the optical signal to or from the optical network; and a communication module coupled to the optical network node that either decodes or encodes the optical signal by identifying or adding at least one wavelength to the optical signal for security, the at least one communication module adds the at least one wavelength for security during an encoding process while during a decoding process the at least one communication module searches and converts the at least one wavelength to establish a communication link to a router.

16. The ROADM structure of claim 15, wherein the communication module comprises a multiplexer module that combines the plurality of wavelengths associated with the optical signal and the at least one wavelength for security to form an encoded optical signal.

17. The ROADM structure of claim 16, wherein the communication module uses optical filters for encoding.

18. The ROADM structure of claim 15, wherein the communication module comprises a demultiplexer module that separates the plurality of wavelengths associated with the optical signal and the at least one wavelength for security to decode the optical signal, the communication module sends the at least one wavelength for security for further processing to determine its credentials.

19. The ROADM structure of claim 18, wherein the communication module uses optical filters for decoding.

20. The ROADM structure of claim 15, wherein the communication protocols comprise Ethernet, general frame procedure, and SONET protocols.

21. A method of managing the security of an optical network, the ROADM structure comprising:

receiving an optical signal for transmission and reception using an optical network node, the optical network node analyzes the optical signal and utilizes communication protocols necessary for optical transmission and reception of the optical signal to or from the optical network;

decoding or encoding the optical signal using a communication module by identifying or adding at least one wavelength to the optical signal for security, the at least one communication module adds the at least one wavelength for security during an encoding process while during a decoding process the at least one communication module searches and converts the at least one wavelength for security to establish a communication link to a router.

22. The method of claim 21, wherein the communication module comprises a optical transmitter that receives an electrical signal and converts the electrical into the optical signal.

23. The method of claim 22, wherein the communication module includes a transmitter that receives the electrical signal provides the electrical signal to the optical transmitter for transmission.

24. The method of claim 21, wherein the communication module comprises an optical receiver that receives the optical signal from the Method node network and converts the optical signal to an electrical signal.

25. The method of claim 24, wherein the communication module comprises a receiver that receives the electrical signal provides the electrical signal to network procedure module for processing.

26. The method of claim 21, wherein the communication module comprises a multiplexer module that combines the plurality of wavelengths associated with the optical signal and the at least one wavelength for security to form an encoded optical signal.

27. The method of claim 26, wherein the communication module uses optical filters for encoding.

28. The method of claim 21, wherein the communication module comprises a demultiplexer module that separates the plurality of wavelengths associated with the optical signal and the at least one wavelength for security to decode the optical signal, the communication module sends the at least one wavelength for security for further processing to determine its credentials.

29. The method of claim 28, wherein the communication module uses optical filters for decoding.

30. The method of claim 21, wherein the communication protocols comprise Ethernet, general frame procedure, and SONET protocols.

* * * * *